Figure 1:
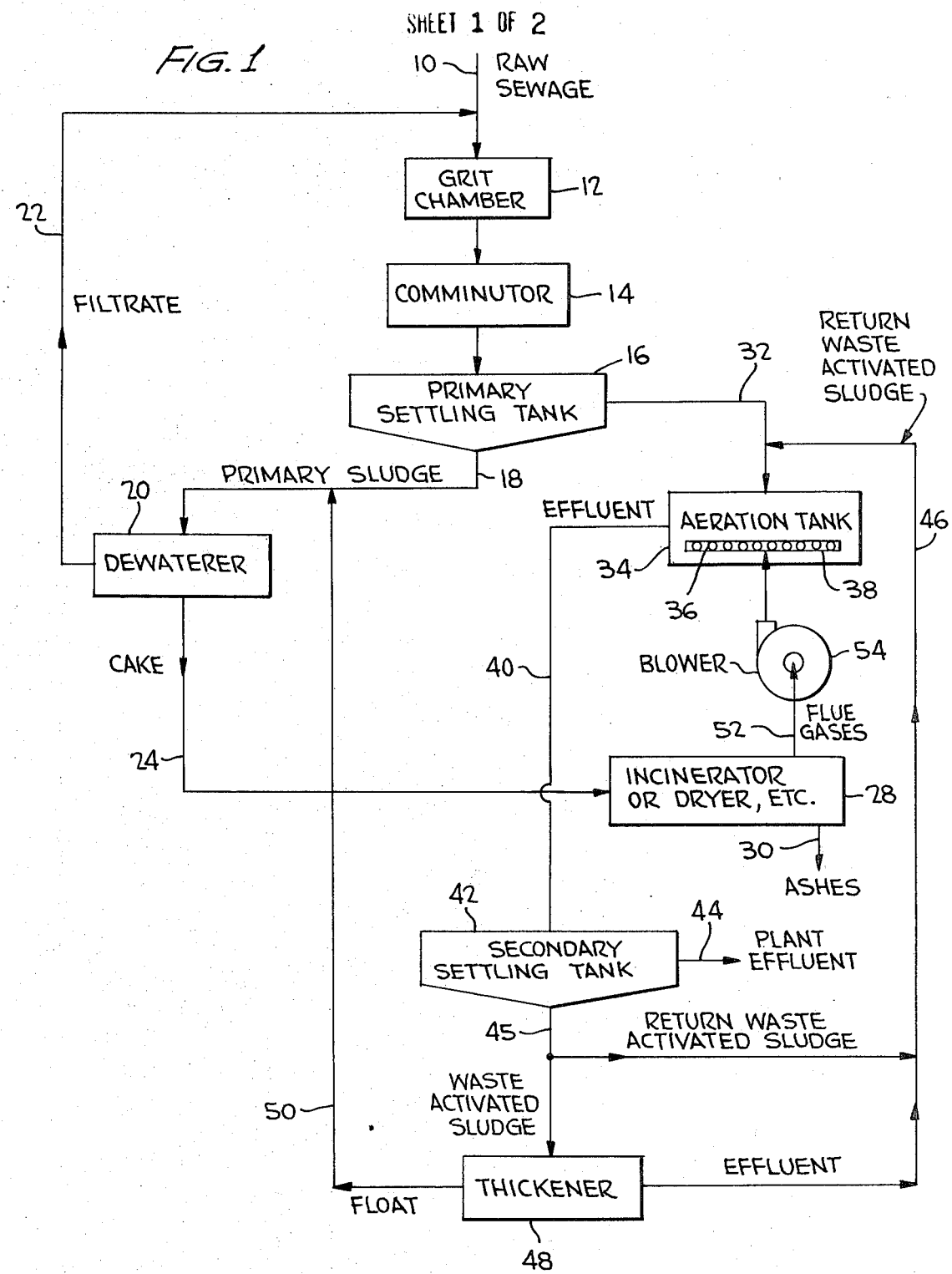

United States Patent [19]
Komline, Sr.

[11] 3,803,806
[45] Apr. 16, 1974

[54] PROCESS FOR THE TREATMENT OF ACTIVATED SLUDGE

[75] Inventor: Thomas R. Komline, Sr., Gladstone, N.J.

[73] Assignee: Komline-Sanderson Engineering Corp., Peapack, N.J.

[22] Filed: Sept. 28, 1972

[21] Appl. No.: 293,040

[52] U.S. Cl............ 55/85, 55/95, 55/228, 55/256, 210/71, 210/73, 210/181, 210/220
[51] Int. Cl............ B01d 47/02
[58] Field of Search....... 210/71, 73, 181, 187, 220, 210/221; 55/84, 95, 256, 228

[56] References Cited
UNITED STATES PATENTS
| | | | |
|---|---|---|---|
| 3,619,980 | 11/1971 | McKay | 55/84 |
| 1,892,681 | 1/1933 | Rankin | 210/181 X |
| 3,332,214 | 7/1967 | Huppke | 55/95 X |
| 3,054,602 | 9/1962 | Proudman | 210/220 X |
| 3,507,788 | 4/1970 | Cole et al. | 210/71 X |

Primary Examiner—John Adee
Attorney, Agent, or Firm—Watson, Cole, Grindle & Watson

[57] ABSTRACT

Hot flue gases containing suspended solid particles, oxygen and other water soluble and insoluble components are injected beneath the surface of sewage sludge. Heat and the above components are transferred from the gases to the sludge. This provides oxygen for activating the sludge.

4 Claims, 2 Drawing Figures

PROCESS FOR THE TREATMENT OF ACTIVATED SLUDGE

This invention related to an improved process for the oxygenation of sewage and the solids contained therein in the treatment method known as the activated sludge process, and in an improved apparatus for carrying out such a process.

In the conventional process, air is blown through the sludge by compressors which develop the pressure necessary to overcome the head of 10 to 15 feet of water normally found in the aeration tanks. This air is taken at atmospheric pressure and temperature, and is the source of oxygen needed to maintain biological activity in the sludge mass. Pure, or concentrated oxygen is also used in a variation of the activated sludge process to hasten the activity.

In many industrial enterprises, and particularly in the case of municipal incineration of solid wastes, or in the drying and or incineration of sewage solids, or industrial wastes, stack gases are generated which, while somewhat depleted of their oxygen content, still may have approximately 10 percent or more oxygen present because proper combustion calls for the presence of excess air beyond that stoichiometrically required to consume the materials being burned, whether they be refuse or conventional fossil fuels (gas, oil, coal, lignite, etc). These gases also contain carbon dioxide and other water soluble gases which contribute to contamination of the atmosphere, and large quantities of particulate material (fly-ash, soot, etc.) which must be removed before the gases can legally be discharged to the environment.

An important object of this invention is to provide simultaneously for the scrubbing and removal of particulate matter, removal of noxious gases such as sulfur dioxide, hydrochloric acid, and nitrogen oxides, and provision of the necessary oxygen to the activated sludge process. Also it is an object to speed up the activated sludge process by warming of the sludge.

In the process of this invention the gases emanating from a furnace, boiler, incinerator or drier are fed into a blower constructed of temperature resistant alloys and/or ceramics, which compresses these dirty gases to a pressure of 5 to 10 pounds per square inch, or enough to force them through interconnecting duct work and piping and thence through nozzles or orifices submerged in the activated sludge (aeration) tanks. Through suitable selection of piping and nozzle sizes, the particulate matter is retained in suspension until it leaves the nozzles or orifices, at which point it contacts the aqueous sludge system, wetting the particles, and causing them to be retained in the sludge system rather than leaving it in the gas bubbles. These particles are then treated along with the organic matter of the activated sludge, subjected to the adsorption-aeration-oxidation phenomena, and become part of the concentrated cake that is removed from the system for disposal such as by incineration, land fill, etc. In addition to being trapped and disposed of in this manner, the trapped inorganic solids act as a filter aid, and improve the ease of filtration or separation of the total quantity of suspended solids from the "wasted" activated sludge, which is generally but not necessarily filtered along with the solids fom the primary tank 16.

It should be stated that in the present state of the art the compressors commercially available may not be able to withstand the degree of exposure to the abrasive and corrosive action caused by handling the particulate matter at the temperatures and pressures involved, and that some pretreatment may be necessary to remove this particulate matter, and re-introduce these particulates back into the flow sheet, preferably prior to dewaterer 20, while still retaining the other advantages of the invention, for scrubbing of noxious gases from the total gas volume, and for utilization of the flue gas heat contents as described elsewhere in this application.

In order to eliminate problems that may exist in compressing high temperature gases, while recovering their heat for use in the process, they may alternatively be drawn through a heat exchanger by an induced draft fan, which then compresses and discharges the cooled gases into the aeration tanks.

At the same time that this process is taking place, heat contained in the compressed gases is absorbed by the activated sludge system, not only cooling the gases but raising the temperature of the liquid in the aeration tanks to as much as 90° to 130° F. from the normal level of 50° to 80° F. At these higher temperatures the activity of the biomass is enhanced to such a degree that consumption of the organic nutrients in the sewage is increased in rate to such a point that the size and holding capacity of such tanks may be reduced, or if of a given size, may handle increased amounts of sewage or increased B.O.D. loadings.

In the course of passing the stack gases through the activated sludge system, water soluble gases, such as hydrochloric acid, sulfur dioxide, and nitrogen oxides are removed, thus improving the quality of the gaseous effluent from the system (normally called "stack gases", but in this case, there is no stack) and eliminating a major source of atmospheric pollution. These gases are dissolved in and trapped in the activated sludge and its aqueous supporting medium, where they can be treated, if necessary, by control of the pH in the various ways known to the art.

In addition to performing all of these supplementary processes, these same stack gases, while somewhat reduced in ocygen content, still have sufficient oxygen present to maintain the dissolved oxygen content of the activated sludge system at an appropriate level. The biological growths which form the active elements of the system rapidly acclimate themselves to a slightly lower pH which results from the dissolving of carbon dioxide and other acidic gases. This process of acclimation occurs without the necessity of any special adjustments, and permits the sludge oxidation processes to proceed in normal fashion.

Figure 2:
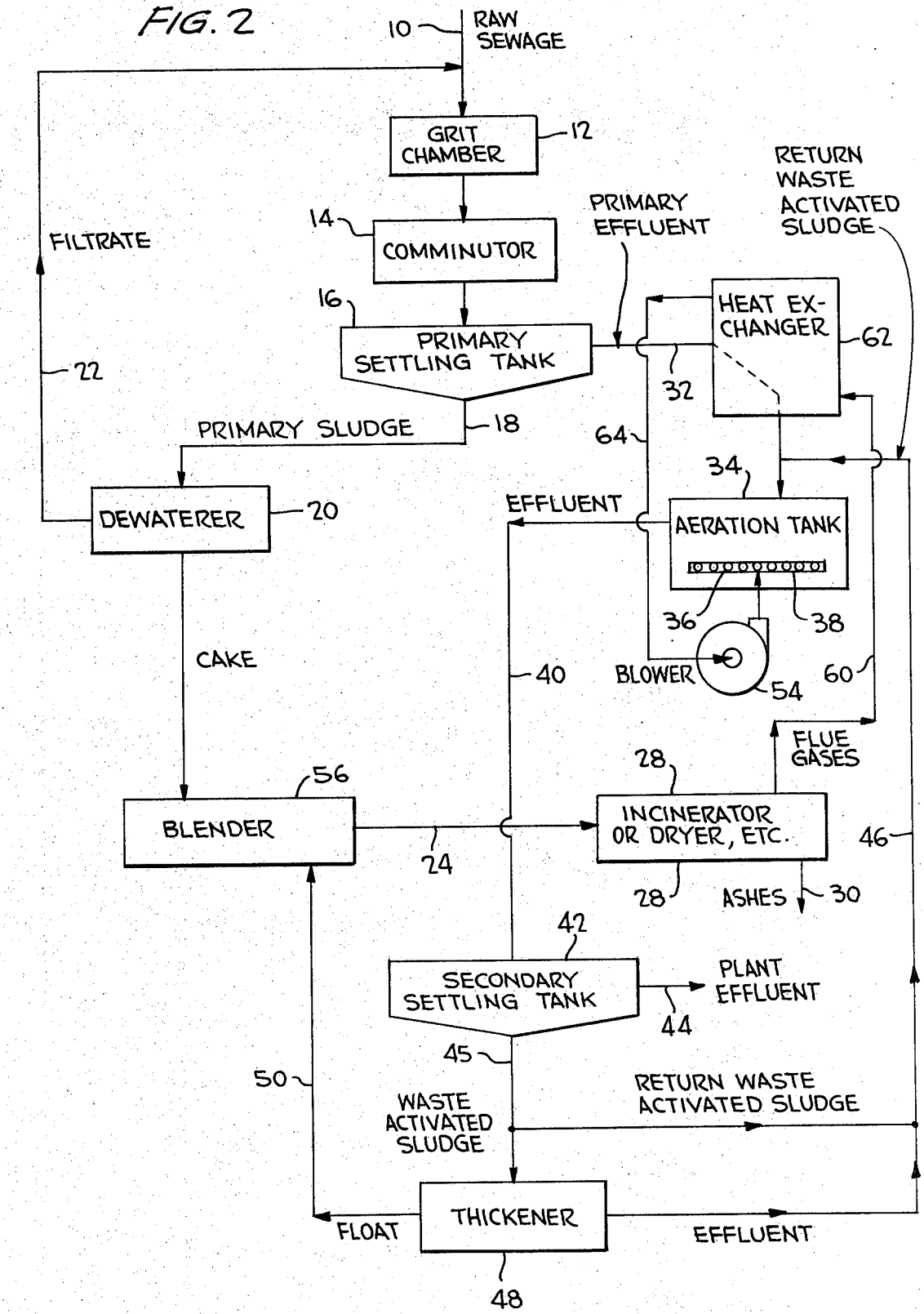

In order to facilitate a rapid understanding of the invention, specific embodiments thereof are illustrated schematically and in simplified form in the accompanying drawings in which:

FIG. 1 comprises a flow chart illustrating the preferred embodiment of the process and the apparatus employed in practicing it;

FIG. 2 is a view generally similar to FIG. 1 but incorporating certain modifications to the process and apparatus.

Referring now in detail to FIG. 1 of the accompanying drawings, raw sewage at an ambient temperature, generally from 50° to 80° F., is usually delivered continuously through a line 10 to a conventional grit chamber 12, thence to a comminuter 14 of conventional design, from whence the sewage is delivered into a primary settling tank 16.

The sludge from the primary settling tank 16 is delivered by means of conduit 18 to a generally conventional dewatering or concentrating means such as the dewaterer 20. The filtrate from the dewaterer 20 is preferably re-circulated through line 22 back to the inflow line 10 and grit chamber 12.

The dewaterer 20 may be a filter of either the rotary vacuum or pressure leaf type, or a centrifuge.

The dewatered sludge from the dewaterer 20 is delivered in the form of cake by conventional conveyor means 24 to a drier or incinerator 28 of any conventional type wherein the solid waste from the drier or incinerator in the form of product or ash is discharged as indicated by the arrow 30 and is disposed of in any conventional manner such as by landfill operations, or, in the case of product, for further use or recycling.

The effluent from the primary settling tank 16 is delivered by conduit 32 to a generally conventional aeration or oxygenation tank 34 where it is agitated and oxygenated by suitable oxygen-containing gases delivered through ports or nozzles 36 in a submerged header or manifold 38 to bubble upwardly through the liquid contents of oxygenation tank for discharge of the treated gases into the atmosphere. A further refinement would be to utilize a submersible motor and spinning disc, with the gases led to this apparatus for dispersion and diffusion. After being suitably oxygenated in the tank 34, the mixed liquor, or sludge containing liquor, is delivered through conduit 40 to a secondary settling tank 42 from which the effluent may be suitably disposed of through line 44 for reception in receiving waters in conventional manner. A portion of the settled sludge from the secondary tank 42 is returned through lines 45 and 46 to the aeration tank for seeding purposes in accordance with usual practice. A portion of the sludge from the secondary settling tank, however, is carried through the line 45 to a flotation thickening apparatus 48 which may be of conventional type such as exemplified in the patent to Warren H. Jones, U.S. Pat. No. 3,175,687, or any other thickening apparatus that may be its equivalent, such as a centrifuge. The sludge is concentrated by the flotation apparatus 48 and is then delivered through conduit 50 to the intake side of the dewaterer 20 where it is intermixed with the primary sludge and therewith subjected to filtering, or concentrating, action by the dewaterer 20 so that the filter cake which is carried to the incinerator 28 includes both the primary and secondary sludge from the primary settling tank and the secondary settling tank.

It should be noted that these secondary solids may also be handled separately with regard to thickening and concentrating, because they have more value as a fertilizer — humus than the primary solids. Projecting this further, one might burn the primary solids to obtain heat for drying the secondary solids.

An important aspect of the invention consists in the combination of the oxygenation tank 34 with an incinerator such as the incinerator 28 in such manner that the flue gases from the incinerator 28 are delivered through a conduit 52 and blower 54 for injection into the contents of the aeration tank in the place of the air usually employed. The blower 54 may be of generally conventional construction except that it will be of temperature resistant materials capable of withstanding the elevated temperatures of the flue gases. The flue gases will normally contain suspended or entrained particles of flyash, soot, and the like and the operation of the blower will normally create a turbulence tending to maintain these particles suspended in the gas stream.

It will be understood that the dimensions and configurations of the blower 54, its associated conduits, the nozzles 36 and header 38 will be chosen so as to maintain sufficient velocity and turbulence in the stream of gases to keep the particles entrained until they are discharged into the sludge in the tank 34. The same approach applies when only a drying process is utilized, except that the gas temperature is lower, on the order of 212° to 250° F.

Injection of the flue gases with entrained particles beneath the surface of the aeration tank will produce an agitation and/or intermixing of the sludge within the tank, and the flue gases will bubble upwardly through the sludge to be scrubbed thereby and discharged into the atmosphere.

As the gases move upwardly through the sludge in the form of bubbles, a substantial portion of the heat from the gases will be transferred to the sludge, thereby cooling the gases prior to their discharge into the atmosphere. At the same time, the temperature of the sludge will be raised quite substantially from its normal level of approximately 50° to 80° F, to approximately 90° to 130° F. or greater, depending on the temperature and volume of the gases supplied. Although the incineration or drying process will have utilized a large portion of the oxygen content of the flue gases, they will still contain approximately 10 percent or more of oxygen simply because proper combustion will have required the presence of excess oxygen beyond that required for the incineration process.

Oxygen from the compressed gases will be also absorbed by and dissolved in the activated sludge and at the elevated temperatures above mentioned, the activity of the oxygen in the vicinity of the organic nutrients in the sewage will be increased in rate sufficiently that the required size and holding capacity of the oxygenation tank may be substantially reduced over that required under normal or ambient temperature conditions.

It will be understood that the flue gases from the drier or incinerator may constitute the sole gases which are employed for oxygenation of the sludge, though the empoyment of additional air or other gases is by no means precluded, and may be useful in maintaining an optimum treatment of the sludge within the tank 34.

Not only do the gases effect a beneficial treatment of the sludge but, in addition, the contact between the gases and the sludge exert a beneficial scrubbing and cooling action on the gases, to improve the character and composition of the gases which are eventually discharged to the atmosphere.

In addition to oxygen, the flue gases normally contain various noxious or undesirable water soluble gases such as sulfur dioxide, hydrochloric acid, and nitrogen-oxides which, during bubbling of the flue gases upwardly through the aqueous sludge, are substantially removed by dissolution in the sludge, so that the gases which eventually enter the atmosphere, will have been substantially purified, as well as cooled by the sludge.

As above mentioned, the flue gases which enter the tank 34, normally may be expected to carry with them substantial quantities of entrained solid particles such as soot and fly ash, the precise composition of which will vary in accordance with the nature of the materials being consumed in the furnace or incinerator from which the flue gases are taken. These solid particles are transferred to and entrapped in the liquefied sludge during the bubbling of the gases upwardly through such sludge and are thoroughly intermixed with the sludge by the agitating action of the gases. Subsequently, when the sludge is subjected to dewatering by a dewaterer 20, it has been found that the solid particles become part of the filter cake formed on the dewaterer 20 and function beneficially as a filter aid to increase the capacity of the filter.

Although as above indicated, the stack gases are flue gases of reduced oxygen content, they will still have sufficient oxygen remaining to maintain the dissolved oxygen content of the activated sludge at an appropriate level. It has been found that the biological growths which form the active elements of the activated sludge system, rapidly acclimate themselves to slightly lower dissolved oxygen content than is present in more conventional activated sludge systems, and also to the slightly lower pH which results from the dissolving of carbon dioxide and other acidic gases.

In the modified form of the invention illustrated in FIG. 2, the process and apparatus are similar in all respects to those above described except for the following departures:

First, it will be noted that the float from the thickener 48 instead of being delivered to the intake for the dewaterer 20 for treatment thereby, as in the preferred embodiment, is delivered together with the cake from the dewaterer into a blender 56 where the cake and the float are intermixed prior to delivery of the mixture through the line 24 to the incinerator or drier 28, all as substantially disclosed in my prior U.S. Pat. No. 3,622,508. This has the advantage that the thickened float with its high water content, is intermixed with the filter cake having a considerably smaller water content to achieve a consistency at which the resulting mixture may be sprayed into a suitable spray drier (not shown) prior to or as part of the incineration process.

In addition, the process and apparatus of FIG. 2 are modified so that the flue gases from the incinerator or drier 28, instead of flowing directly from the unit 28 through the blower 54, proceed through the line or conduit 60 to a heat exchanger unit which may be of any conventional type which may comprise a scrubbing tower 62, and thence are drawn through conduit 64 into the intake of the blower 54 after being cooled by the heat exchanger. Also, where the heat exchange is in the form of a scrubber, it will not only function to cool the gases, but will remove a substantial proportion of the particulate matter and the noxious gases therefrom. Thus it is made possible to employ a conventional commercially available blower 54 without substantial risk of damage thereto from the noxious gases and particulate matter, or from high temperatures.

Having thus described my invention, I claim:

1. The process of treating hot flue gases and sewage sludge to reduce the polluting effects of each on the environment of mankind, said sludge including organic solids and liquids, the initial temperature of said flue gases being substantially above 130°F and containing suspended solid particles, oxygen and other water soluble and water insoluble gaseous components, the normal temperature of said sludge being from 50°F to 80°F., comprising the steps of injecting said hot flue gases into said sludge, beneath the surface thereof in direct heat exchanging contact with said sludge to bubble upwardly therethrough, to thereby transfer said solid particles and a portion of the heat and water soluble gaseous components from the flue gases to said sludge, to provide oxygen for activating said sludge, then releasing the undissolved flue gases to the atmosphere, said hot flue gases being introduced continuously into the sludge at a volumetric rate to raise the temperature of said sludge to between 90°F and 130°F to accelerate interaction between the dissolved oxygen and the sludge.

2. The process which includes the steps of claim 2 and the subsequent steps of filtering the said sludge to form a cake incorporating the organic solids from the sludge as well as said solid particles from the flue gases.

3. The process which includes the steps of claim 1 and the subsequent steps of concentrating the said sludge to form a cake, including the organic solids from said sludge, as well as the transferred solid particles from said flue gases, then incinerating all of said solids to form at least a portion of the said flue gases.

4. Apparatus for simultaneously treating hot flue gases and activated sewage sludge to reduce the polluting effects of each on the environment of mankind, comprising in combination, an incinerator, the combustion products of which include hot flue gases containing entrained solid particles, an oxygenation tank, and means for supplying sludge to and removing it from said tank, means for pressurizing said flue gases and for introducing said pressurized flue gases into the sludge within said oxygenation tank at a level below the surface of the sludge in said tank, while maintaining the said solid particles entrained within the gases, whereby said gases bubble upwardly through the sludge in intimate heat exchanging contact therewith and transfer heat and the major portion of the entrained solid particles as well as condensible vapors to the sludge, prior to discharge of the flue gases to the atmosphere, said sludge removing oxygen and noxious soluble gaseous components from the flue gases by dissolution in the sludge, a filter receiving said sludge from the oxygenation tank and removing said solid particles as well as organic solids from the sludge, and means for transferring said organic solids and said solid particles from the filter into said incinerator.

* * * * *

UNITED STATES PATENT OFFICE
CERTIFICATE OF CORRECTION

Patent No. 3,803,806  Dated April 16, 1974

Inventor(s) Thomas R. Komline, Sr.

It is certified that error appears in the above-identified patent and that said Letters Patent are hereby corrected as shown below:

In claim 2, line 1, change the numeral "2" to

-- 1 --.

Signed and sealed this 1st day of October 1974.

(SEAL)
Attest:

McCOY M. GIBSON JR.
Attesting Officer

C. MARSHALL DANN
Commissioner of Patents